Feb. 5, 1935.  E. BAUMGRATZ ET AL  1,990,017

ELECTRICALLY DRIVEN PORTABLE TOOL

Filed Dec. 6, 1933

Inventors
Ernst Baumgratz
Franz Kratz
Hermann Steinhart
by Steward & McKay
their attorneys Patented Feb. 5, 1935

1,990,017

UNITED STATES PATENT OFFICE 1,990,017

ELECTRICALLY DRIVEN PORTABLE TOOL

Ernst Baumgratz, Franz Kratz, and Hermann Steinhart, Stuttgart, Germany, assignors to Robert Bosch Aktiengesellschaft, Stuttgart, Germany Application December 6, 1933, Serial No. 701,200
In Germany December 10, 1932

5 Claims. (Cl. 172—36)

The present invention relates to electrically driven portable tools having a high-speed tool spindle.

It is known to arrange a fan in the interior of such tools to serve for the ventilation of the driving motor. In these tools the air after leaving the motor casing is blown into the atmosphere.

According to the present invention, air-guiding passages are provided in the electric tool which are led from the fan along the tool spindle towards the working point. In this way not only is the driving motor cooled, but also the tool spindle. It is consequently possible, even when the spindle bearing becomes greatly heated at the highest speeds, to grasp the appliance directly at or in proximity to the clamped tool, in order in this way to obtain a sensitive guidance of the tool.

An example of construction of the invention is shown in the accompanying drawing, in which:—

Figure 1:
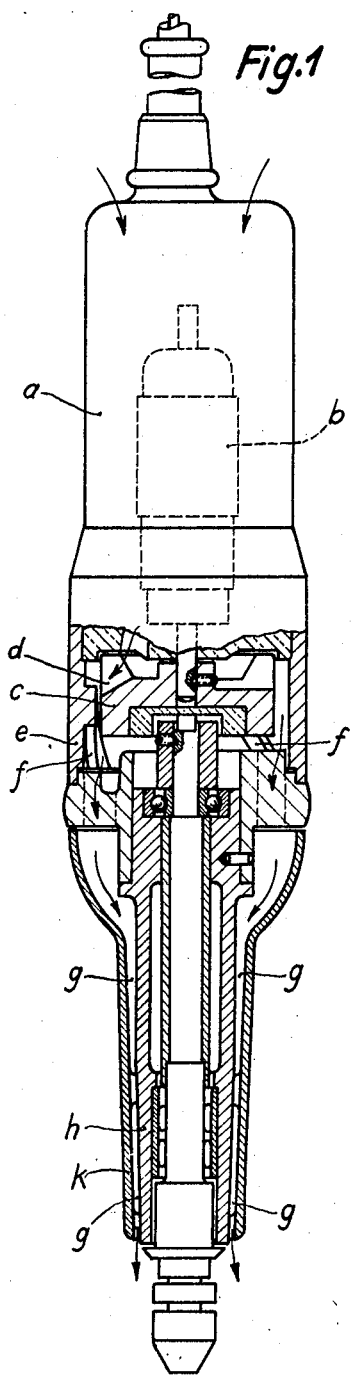
Figure 1 is a general view, partly in section, of an electrically driven tool.
Figure 2:
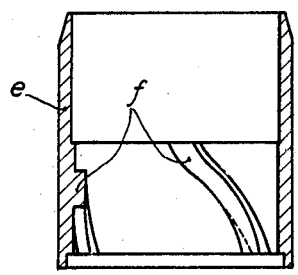
Figures 2 and 3 show a part of the casing with the air-guiding ribs provided therein.
Figure 3:
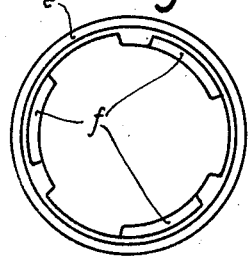

In Figure 1, $a$ denotes the handle or casing of an electrically driven tool having a built-in driving motor $b$. The motor runs at speeds of about 15,000 to 25,000 revolutions per minute. $c$ denotes a fan, which is mounted on the shaft of the motor, and by means of vanes $d$ draws air through the electric motor $b$ and throws it outwardly against the part $e$ of the casing. On the part $e$ of the casing (Figs. 2 and 3) guide-ribs $f$ for the air are provided in the form of screw-threads. They take the air thrown outwards by the vanes of the fan and divert it in an axial direction towards the front into passages $g$, which lead along the bearing neck $h$ in which the tool spindle is mounted. The air here passes between the bearing neck $h$ and a tubular extension $k$ of the motor casing, and is blown into the atmosphere in the direction of the working point.

The sleeve $k$ preferably consists of a heat-insulating material, so that even when the spindle bearing becomes heated to its greatest degree the appliance can be held very close to the clamped tool, without the person working with the tool being affected by this heating.

We declare, that what we claim is:

1. An electrically-driven portable tool comprising a casing, a bearing sleeve extending from said casing, a motor in the casing, a spindle driven by said motor and extending along said bearing sleeve, a cooling fan driven by the motor, said casing having guide ribs on its inner surface directing the air from said fan along the bearing sleeve.

2. An electrically-driven portable tool comprising a casing, a bearing sleeve extending from said casing, a motor in the casing, a spindle driven by said motor and extending along said bearing sleeve, a cooling fan driven by the motor, said casing having screw-thread-like guide ribs on its inner surface directing the air from said fan along the bearing sleeve.

3. An electrically-driven portable tool comprising a casing, a bearing sleeve extending from said casing, a motor in the casing, a spindle driven by said motor, and extending along said bearing sleeve, a cooling fan driven by the motor, and screw-thread-like air guiding means in said casing for directing the air from said fan along the bearing sleeve.

4. An electrically-driven portable tool comprising a casing, a bearing sleeve extending from said casing, a motor in the casing, a spindle driven by said motor and extending along said bearing sleeve, a cooling fan driven by the motor, screw-thread-like air guiding means in said casing and an enclosing sleeve arranged around said bearing sleeve for guiding the air from the fan along the bearing sleeve.

5. A hand tool comprising a casing having an apertured bearing neck projecting therefrom, a motor in said casing, a spindle driven by said motor and extending from within said casing through said bearing neck and outwardly of said casing to an unconfined outer end, a cooling fan driven by said motor, means provided with helical guide ribs for directing the air from said fan to said bearing neck, and a sleeve of heat-insulating material surrounding said bearing neck as a cover thereover and forming a hand grip for guiding the tool, said sleeve guiding the air from the fan along said bearing neck.

FRANZ KRATZ.
HERMANN STEINHART.
ERNST BAUMGRATZ.